Patented Apr. 8, 1952

2,592,191

UNITED STATES PATENT OFFICE 2,592,191

QUATERNARY AMMONIUM SALTS OF N-(3,3-DIPHENYLPROPYL) PYRROLIDINE

Arlo Wayne Ruddy, Albany, N. Y., assignor to Sterling Drug Inc., New York, N. Y., a corporation of Delaware No Drawing. Application September 16, 1949, Serial No. 116,226

6 Claims. (Cl. 260—313)

This invention relates to quaternary ammonium salts of the formula

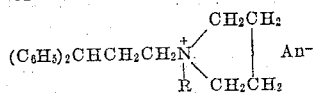

wherein R is a lower-alkyl or lower-aralkyl group and An⁻ is a non-toxic anion.

These compounds are useful for therapeutic purposes, for instance as antispasmodics.

The intermediate, N-(3,3-diphenylpropyl) pyrrolidine, can be prepared as follows. Diphenylmethane is reacted with a beta-(N-pyrrolidyl)-ethyl halide in the presence of a strong metalating agent such as sodium, sodium amide, potassium amide, phenyl sodium, sodium triphenylmethyl, sodium hydride, etc., under anhydrous conditions.

Alternatively, diphenylacetonitrile is reacted with a beta-(N-pyrrolidyl) ethyl halide in the presence of a strong metalating agent such as sodium amide, potassium amide, sodium hydride, etc. and the nitrile group then replaced by hydrogen by further treatment with sodium amide. The following equations will illustrate this preparation.

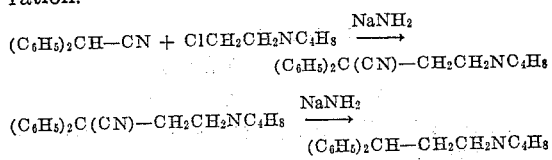

The quaternary salts which constitute my invention are usually prepared by addition of the intermediate, N-(3,3-diphenylpropyl) pyrrolidine, and a lower-alkyl or a lower-aralkyl ester of an acid, either inorganic or organic. Examples of such esters include methyl chloride, methyl bromide, methyl iodide, ethyl chloride, ethyl bromide, propyl bromide, propyl iodide, butyl bromide, benzyl chloride, benzyl bromide, methyl sulfate, ethyl sulfate, methyl benzenesulfonate, methyl p-toluenesulfonate, etc. The reaction takes place by admixture of the two components, or, preferably, dissolving the components together in an inert organic solvent such as benzene, ether or ethyl acetate, with or without heating.

Sometimes direct addition of an ester, RAn, to the tertiary-amine does not readily occur due to the properties of the particular ester used; this is the case if the anion, An, is derived from a relatively weak acid such as citric acid or tartaric acid. In such cases it is possible by use of metathetical reactions to replace the anion of one quaternary ammonium salt by a different anion without reconversion to the tertiary amine. This is usually effected by treatment of an aqueous solution of the quaternary ammonium salt, QAn, with silver oxide (hydroxide). The silver salt, AgAn, is precipitated, leaving in solution the quaternary ammonium hydroxide, QOH. It is prerequisite, of course, that the salt AgAn be insoluble in water. The quaternary ammonium hydroxide may then be neutralized with the appropriate acid, HAn', to give any desired salt. For example, methiodides are generally easier to prepare by direct addition than methochlorides. Methyl iodide reacts more readily and is more convenient to use than methyl chloride. However, the methochloride can be readily prepared from the methiodide by the method just described. Treatment of a solution of the methiodide with silver oxide precipitates silver iodide leaving a solution of the quaternary ammonium hydroxide. Neutralization of this solution with hydrochloric acid gives the methochloride which can be obtained with concentration of the solution.

The following will illustrate my invention more fully:

A. 2,2-diphenyl-4-(N-pyrrolidyl) butanenitrile

A suspension of 15 g. of sodium amide in 150 ml. of dry benzene contained in a 1-liter, 3-necked flask equipped with a thermometer, dropping funnel and reflux condenser was warmed at 40° C., and 57.9 g. of diphenylacetonitrile dissolved in dry benzene was added in a dropwise manner with stirring. The mixture was then cooled to 10° C. and 43.5 g. of beta-(N-pyrrolidyl) ethyl chloride was added dropwise with stirring. This was refluxed for one-half hour, cooled to 10° C. and 250 ml. of water was slowly added to decompose excess sodium amide. The benzene layer was separated and the aqueous layer was extracted with benzene. The combined benzene extracts were washed with 200 ml. of 3 N hydrochloric acid, which was then made alkaline with 35% sodium hydroxide solution. The product which had separated as an oil was extracted with benzene, and the benzene solution was washed with water and dried over anhydrous calcium sulfate. After removal of the benzene, the product was distilled at reduced pressure through a 12-inch vacuum-jacketed Vigreux column, and the distillate was crystallized from hot petroleum ether (b. p. 60–70° C.), giving 71 g. (82%) of 2,2-diphenyl-4-(N-pyrrolidyl) butanenitrile, m. p. 73.5–74.5° C.

B. N-(3,3-diphenylpropyl) pyrrolidine

A solution of 49.4 g. of 2,2-diphenyl-4-(N-pyrrolidyl) butanenitrile in 150 ml. of benzene was added gradually to a refluxing suspension of 30 g. of sodium amide in 100 ml. of benzene. The resulting mixture was refluxed for twelve hours. After cooling, the excess sodium amide was destroyed by adding 200 ml. of water, and the benzene layer was separated. The water layer was extracted with ether to remove residual organic material, and the ether extracts were combined with the benzene and the whole dried over sodium hydroxide pellets. After removal of the solvent, the residual oil was distilled at reduced pressure to give 42.6 g. (94%) of N-(3,3-diphenylpropyl)-pyrrolidine, b. p. 128–136° C. (0.5 mm.);

$$n_D^{25}=1.5637$$

C. *N-(3,3-Diphenylpropyl)-N-methylpyrrolidinium Iodide*

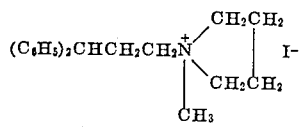

A solution of 12.8 g. of N-(3,3-diphenylpropyl) pyrrolidine and 14 g. of methyl iodide in anhydrous ether was warmed gently, then cooled, and induced to crystallize by scratching. A small amount of absolute alcohol was added and the mixture was warmed on a steam bath. The mixture was then diluted with anhydrous ether, cooled, and the precipitate was collected by filtration, giving 16.7 g., m. p. 155–156° C. A recrystallization from a mixture of 35 ml. of absolute alcohol and 100 ml. of ether gave a pure sample of N-(3,3-diphenylpropyl)-N-methylpyrrolidinium iodide, m. p. 156.6–157° C.

Anal. Calcd: C, 58.97; H, 6.43; N, 3.44.
Found: C, 58.80; H, 6.15; N, 3.23.

D. A solution of N-(3,3-diphenylpropyl) pyrrolidine and an excess of benzyl chloride in dry benzene was warmed for several hours. Upon cooling and concentrating the solution, a precipitate of N-(3,3-diphenylpropyl)-N-benzylpyrrolidinium chloride having the formula

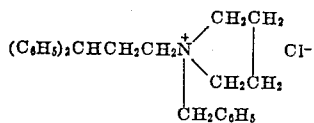

was obtained, m. p. 163.5–164.5° C. when recrystallized from an isopropyl alcohol-ether mixture.

E. A solution of N-(3,3-diphenylpropyl) pyrrolidine and an excess of ethyl bromide in dry benzene was warmed for several hours. Upon cooling and concentrating the solution, a precipitate of N-(3,3-diphenylpropyl)-N-ethylpyrrolidinium bromide having the formula

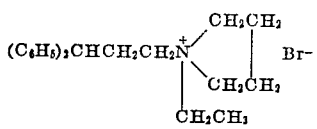

was obtained, m. p. 157–158° C. when recrystallized from an isopropyl alcohol-ether mixture.

If an aqueous solution of N-(3,3-diphenylpropyl)-N-methylpyrrolidinium iodide is agitated with a suspension of silver oxide, a precipitate of silver iodide is gradually formed. Removal of the silver iodide by filtration gives a solution of N-(3,3-diphenylpropyl)-N-methylpyrrolidinium hydroxide. This solution when treated with an equivalent amount of hydrochloric acid, nitric acid, sulfuric acid, citric acid, lactic acid, or tartaric acid, followed by evaporation of the solution, gives respectively: N-(3,3-diphenylpropyl)-N-methylpyrrolidinium chloride; N-(3,3-diphenylpropyl)-N-methylpyrrolidinium nitrate; N-(3,3-diphenylpropyl)-N-methylpyrrolidinium sulfate or bisulfate; N-(3,3-diphenylpropyl)-N-methylpyrrolidinium citrate or acid citrate; N-(3,3-diphenylpropyl)-N-methylpyrrolidinium lactate; and N-(3,3-diphenylpropyl)-N-methylpyrrolidinium tartrate or bitartrate.

I claim:

1. A quaternary ammonium salt of the formula

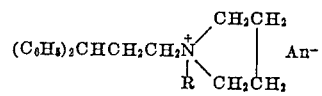

wherein R is a member of the group consisting of lower-alkyl and lower-aralkyl radicals and An⁻ is a non-toxic anion.

2. A quaternary ammonium salt of the formula

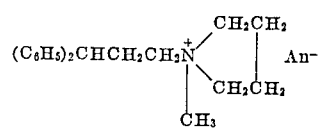

wherein An⁻ is a non-toxic anion.

3. N-(3,3-Diphenylpropyl)-N-methylpyrrolidinium iodide having the formula

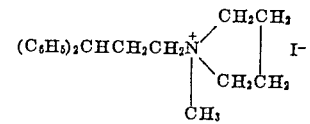

4. A quaternary ammonium salt of the formula

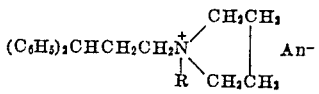

wherein R is a lower-alkyl radical and An⁻ is a non-toxic anion.

5. N-(3,3-Diphenylpropyl)-N-ethylpyrrolidinium bromide having the formula

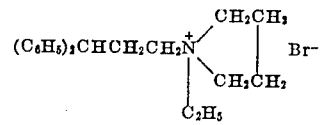

6. N-(3,3-Diphenylpropyl)-N-benzylpyrrolidinium chloride having the formula

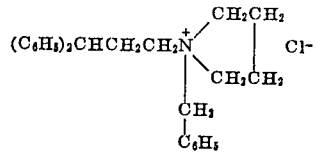

ARLO WAYNE RUDDY.

REFERENCES CITED

The following references are of record in the file of this patent:

UNITED STATES PATENTS

| Number | Name | Date |
|---|---|---|
| 2,152,047 | Hahl | Mar. 28, 1939 |

FOREIGN PATENTS

| Number | Country | Date |
|---|---|---|
| 884,569 | France | Aug. 20, 1943 |

OTHER REFERENCES

Chemical Abst., vol. 31, p. 4963 [6].
Jr. Chem. Soc. (London), Supplementary Issue, May 1949, pp. S144–S158.